United States Patent [19]

Sasa et al.

[11] Patent Number: 4,875,720

[45] Date of Patent: Oct. 24, 1989

[54] FLUID COUPLING

[75] Inventors: Takeya Sasa; Yoshikazu Kobayashi; Reichi Makishima, all of Tokyo, Japan

[73] Assignee: Nitto Kohki Co., Ltd., Tokyo, Japan

[21] Appl. No.: 268,863

[22] Filed: Nov. 8, 1988

[30] Foreign Application Priority Data

Nov. 10, 1987 [JP] Japan .......................... 62-171799[U]

[51] Int. Cl.⁴ .............................................. F16L 33/26

[52] U.S. Cl. .................................. 285/249; 285/250; 285/362; 285/903

[58] Field of Search ............... 285/903, 249, 250, 321, 285/362

[56] References Cited

U.S. PATENT DOCUMENTS

| | | | |
|---|---|---|---|
| 1,710,416 | 4/1929 | Goeller . | |
| 1,738,216 | 12/1929 | Wallace . | |
| 2,503,169 | 4/1950 | Phillips | 285/250 |
| 2,731,058 | 1/1956 | Smisko . | |
| 2,961,630 | 11/1960 | Duncan . | |
| 3,425,026 | 1/1969 | Theunissen . | |
| 3,635,501 | 1/1972 | Thorne-Thomsen . | |
| 3,649,052 | 3/1972 | Snyder, Jr. | 285/362 X |
| 3,871,691 | 3/1975 | Takagi et al. | 285/321 |
| 3,934,902 | 1/1976 | McNamee | 285/903 X |
| 4,014,467 | 3/1977 | Ferguson . | |
| 4,437,691 | 3/1984 | Laney | 285/903 X |
| 4,630,850 | 12/1986 | Saka | 285/903 X |
| 4,674,775 | 6/1987 | Tajima et al. | 285/903 X |

FOREIGN PATENT DOCUMENTS

| | | | |
|---|---|---|---|
| 222051 | 5/1987 | European Pat. Off. . | |
| 2110550 | 9/1972 | Fed. Rep. of Germany . | |
| 2624521 | 12/1976 | Fed. Rep. of Germany . | |
| 1101782 | 10/1955 | France | 285/250 |
| 1146672 | 11/1957 | France . | |
| 5894988 | 6/1983 | Japan | 285/903 |
| 9853 | 1/1907 | Netherlands . | |
| 1371609 | 10/1974 | United Kingdom | 285/903 |

*Primary Examiner*—Thomas F. Callaghan
*Attorney, Agent, or Firm*—Nixon & Vanderhye

[57] ABSTRACT

A fluid coupling for a corrugated pipe, comprising a coupling body having a large-diameter portion and a small-diameter portion through which the corrugated pipe can be passed, metallic seal means arranged at the small-diameter portion, for sealing an end portion of a corrugated pipe pressed against the same, a ring-shaped engaging member disposed in the large-diameter portion and having its inside diameter reducible to a size smaller than the diameter of the top of corrugation of the corrugated pipe, and retaining means having an outside diameter small enough to be inserted into the small-diameter portion, an inside diameter large enough to be penetrated by the corrugated pipe, and a first end portion capable of engaging the engaging member, the retaining means being adapted to press the end portion of the corrugated pipe against the seal means, while transferring the elastic member from the large-diameter portion to the small-diameter portion, thereby holding the engaging member in a predetermined axial position such that the engaging member is located in a root portion of the corrugated pipe.

10 Claims, 3 Drawing Sheets

1 22 21 8 3 7 2 10 4 23 16 6 17 19 1 22 20 18

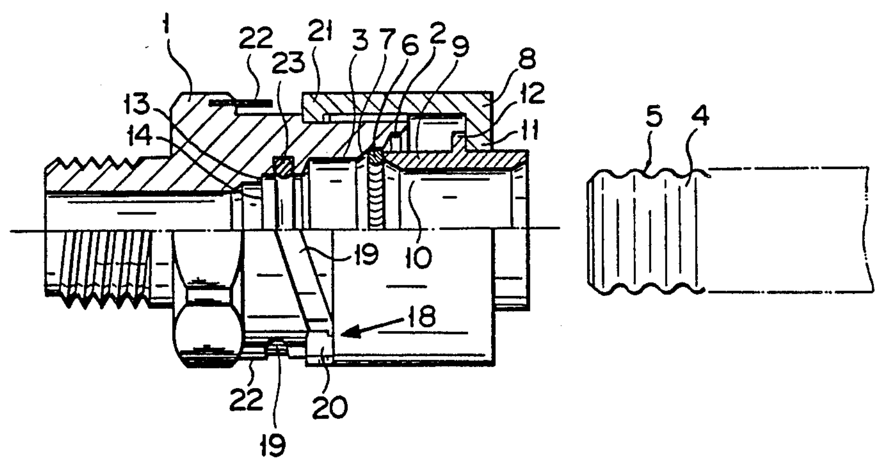
F I G. 1
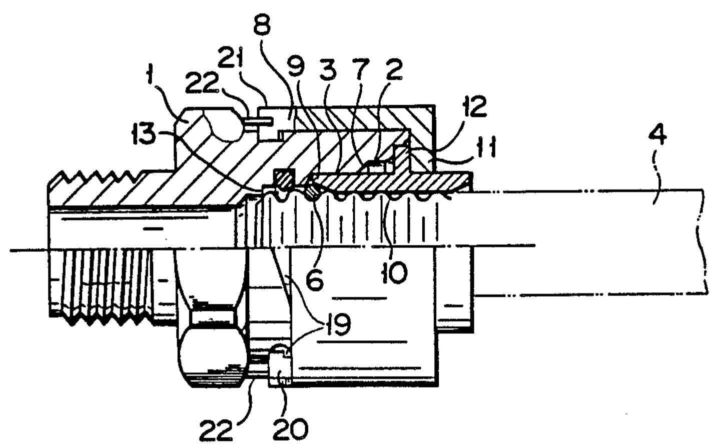
F I G. 2

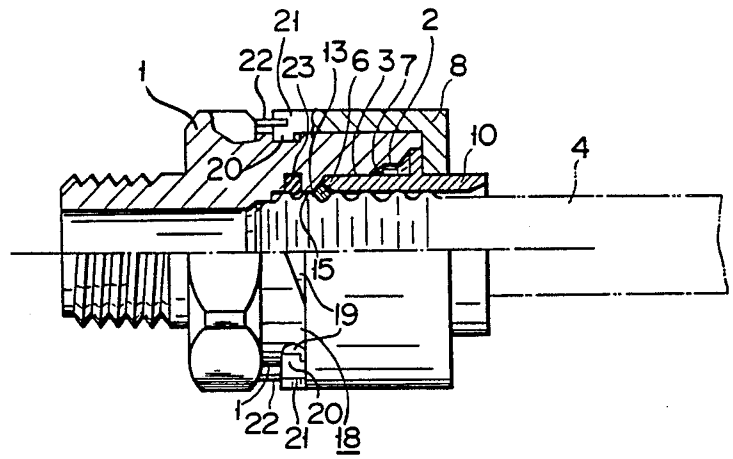
F I G. 3
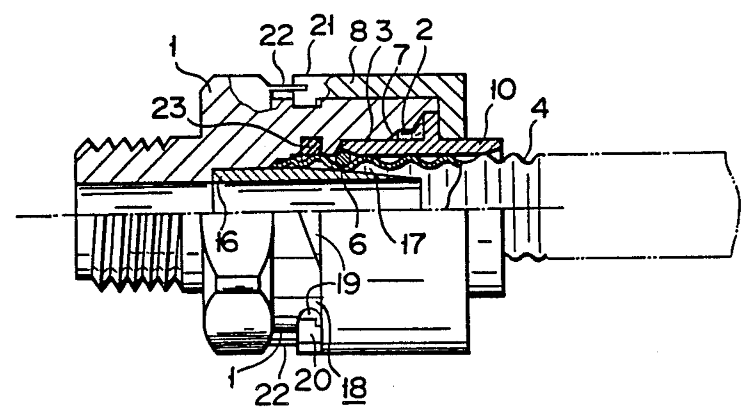
F I G. 4

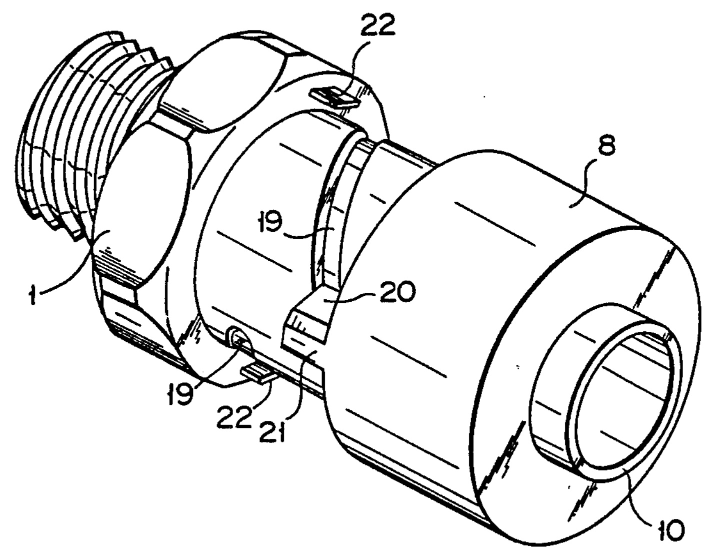
F I G. 5

FLUID COUPLING

BACKGROUND OF THE INVENTION

1. Field of the Invention

The present invention relates to a fluid couplings or fittings for connecting corrugated pipes, such as bellows-shaped metallic flexible pipes.

2. Description of the Related Art

In recent years, metallic corrugated pipes have come to be used more and more as replacements for conventional steel pipes used as indoor gas piping in houses and the like, since they are flexible and thus more workable. However, since corrugated pipes have a bellows-shaped outline with top and root portions arranged alternately they are less easy to connect to each other or to other pipes than are conventional steel pipes. For this reason, fluid couplings used with corrugated pipes tend to have connecting mechanisms which are complicated and therefore difficult and time-consuming to operate. As a result, there is considerable demand for the development of a fluid coupling which will permit corrugated pipes to be more easily conneted to each other and to other types of pipe.

Moreover, there is demand for the elimination of the rubber gaskets which are conventionally used to seal most corrugated pipes in order to prevent gas leakage, since in the event of a fire breaking out, the rubber gaskets will most likely be melted by the heat produced, thereby causing gas to leak out and further feed the fire.

SUMMARY OF THE INVENTION

The object of the present invention is to provide a fluid coupling free of the aforementioned problems, and enjoying high working efficiency, simple construction, and low manufacturing costs.

In order to achieve the above object, according to the present invention, there is provided a fluid coupling for a corrugated pipe, which comprises: a coupling body including first and second end portions and an axial through hole, the through hole having a large-diameter portion, a small-diameter portion through which a corrugated pipe can be passed, and a fluid passage, arranged from first end portion toward the second end portion; metallic seal means arranged at the small-diameter portion, for sealing an end portion of a corrugated pipe pressed against the same; a ring-shaped engaging member disposed in the large-diameter portion and having an inside diameter small enough to be passed through the corrugated pipe when in the large-diameter portion, the ring-shaped member having its inside diameter reducible to a size smaller than the diameter of the top of corrugation of the corrugated pipe when moved into the small-diameter portion; and retaining means having an outside diameter small enough to be inserted into the small-diameter portion, an inside diameter large enough to be penetrated by the corrugated pipe, and a first end portion capable of engaging the ring-shaped member, the retaining means being adapted to press the end portion of the corrugated pipe against the seal means, while transferring the ring-shaped member from the large-diameter portion to the small-diameter portion, when moved from the first end portion side of the coupling body to the second end portion side thereof, thereby holding the ring-shaped member in a predetermined axial position such that the ring-shaped member is located in a root portion of the corrugated pipe.

Preferably, the whole fluid coupling is made of metal.

In connecting the corrugated pipe to the fluid coupling, the corrugated pipe is inserted into the first end portion at the front end of the coupling body, and the retaining means is moved to the second end portion. Thereupon, the first end portion pushes the ring-shaped engaging member at the large-diameter portion of the coupling body, thereby transferring the ring-shaped member to the small-diameter portion. As the ring-shaped member moves in this manner, it is radially contracted by the small-diameter portion. Thus, the ring-shaped member is engagedly pressed against the outer peripheral root portion of the inserted corrugated pipe, thereby preventing the pipe from slipping out of the coupling body. Further, the ring-shaped member, engaging the outer peripheral surface of the corrugated pipe and pushed by the retaining means, causes the pipe to move in the same direction. As a result, the front end of the corrugated pipe is pressed against the metallic seal means inside the coupling body, to be sealed thereby.

Thus, the corrugated pipe can be connectedly fixed to the coupling body in a manner such that the ring-shaped engaging member in the body is radially contracted to be pressed against the outer peripheral root portion of the inserted pipe. Also, the front end portion of the corrugated pipe can be sealed by means of the metallic seal means disposed inside the coupling body. Thus, the connection work is easy.

The individual members of the fluid coupling may be made of metal, and the fluid coupling may be used to connect a metallic corrugated pipe for gas supply whose front end portion is metal-sealed. In case of a fire, according to such an arrangment, the metal seal means can prevent to minimize gas leakage from the corrugated pipe. Accordingly, an accident due to a gas leak can be prevented. Thus, the fluid coupling according to the present invention can be very conveniently used for the connection of a corrugated pipe, especially one for use as an indoor gas pipe. Since the fluid coupling has a simple construction, moreover, it can be easily manufactured at low cost.

BRIEF DESCRIPTION OF THE DRAWINGS

FIG. 1 is a partial longitudinal sectional view of a fluid coupling according to an embodiment of the present invention;

FIG. 2 is a partial longitudinal sectional view showing an arrangement in which a corrugated pipe is connectedly fixed to the fluid coupling shown in FIG. 1 and sealed;

FIGS. 3 and 4 are partial longitudinal sectional views showing seal means according to alternative embodiments; and FIG. 5 is a perspective view schematically showing the arrangement of FIG. 1.

DETAILED DESCRIPTION OF THE PREFERRED EMBODIMENTS

Although preferred embodiments of the present invention will now be described in detail with reference to the accompanying drawings, it is to be understood that the invention is not limited to those precise embodiments.

In these drawings, numeral 1 designates a cylindrical coupling body which, preferably made of metal, has an axial through hole, thus constituting a fluid coupling. This axial through hole has large-diameter portion 2 and small-diameter portion 3 adjoining the rear end of portion 2 in the front end portion (right-hand portion in FIG. 1) of cylindrical body 1. A gas or fluid passage is formed in the rear end side of small-diameter portion 3. A screw, which is formed on the opposite end portion of body 1, can be threadedly fitted to an ordinary pipe having cylindrical inner and outer surface. A ring-shaped engaging member or engaging body 6 is held in large-diameter portion 2 so as to be slidable toward small-diameter portion 3. Engaging body 6 can expands and contract in the radial direction. When it contracts, the engaging body engages outer periphery of root portion 5 of bellows-shaped metallic corrugated pipe 4 for, e.g., gas supply, which is connectedly inserted in cylindrical body 1. Large-diameter portion 2 has an inner diameter such that the inside diameter of engaging body 6 thereon is great enough to allow the passage of pipe 4. Small-diameter portion 3 has an inner diameter which allows the passage of corrugated pipe 4 and such that engaging body 6, radially reduced in diameter by being pushed from portion 2 to portion 3 by retaining means (mentioned later), is engagedly pressed against root portion 5 of pipe 4. To facilitate the movement of engaging body 6, the difference in diameter between large- and small-diameter portions 2 and 3 should preferably be half the thickness of engaging body 6 or less. To the same end, moreover, cone shaped taper surface 7 extends between portions 2 and 3. Ring-shaped engaging body 6 is not particularly restricted in configuration, provided it can expand and contract in the radial direction. For example, it may be a C-ring, a garter spring, or a circular spring ring in which both ends of a spring wire are juxtaposed to each other for relative movement in circumferencial direction formed of a heat-resistant material, such as metal. In this embodiment, however, a metallic circular spring ring is used as engaging body 6.

Numeral 8 designates a metal cap or sleeve which is slidably mounted on cylindrical body 1 for axial movement. The aforesaid retaining means, which is coaxial with body 1, is fitted in the front end portion of sleeve 8. It has an outer diameter substantailly equal to the inside diameter of small-diameter portion 3 and small enough to permit insertion therein, and an inside diameter great enough to permit insertion of corrugated pipe 4. The retaining means comprises sleeve 10 whose open end face 9 pushes engaging body 6, held on large-diameter portion 2, toward small-diameter portion 3 as sleeve 8 moves rearward. In order to facilitate the movement of engaging body 6 from portion 2 to portion 3, the inner edge portion of end face 9 is tapered oppositely to taper surface 7. In this embodiment, sleeve 8 and cylindrical pressure sleeve 10 are constructed separately, and projection 12 on the outer peripheral surface of sleeve 10 is adapted to engage the inner surface of wall portion 11, which is formed at the front end (right-hand side of FIG. 1) of sleeve 8, and has a center hole. Alternatively, however, sleeves 8 and 10 may be formed integrally.

If corrugated pipe 4 is inserted through pressure sleeve 10 into cylindrical body 1 to move cap sleeve 8 rearward, sleeve 10 moves so that its open end face 9 causes engaging body 6, held on large-diameter portion 2, to move toward small-diameter portion 3. As engaging body 6 is moved to portion 3 in this manner, it is radially reduced in diameter, so that it is engagedly pressed against root portion 5 around corrugated pipe 4 which is inserted in cylindrical body 1. Thus, pipe 4 is prevented from slipping out of body 1. The movement of engaging body 6 at small-diameter portion 3 causes pipe 4 to advance in the same direction while body 6 is pressed against pipe 4.

Numeral 13 designates metallic seal means which is disposed inside cylindrical body 1. Seal means 13 is pressed, for sealing, against the front end portion of corrugated pipe 4 which, having its outer peripheral surface pressed by engaging body 6 moving along small-diameter portion 3, advances in the same direction as body 6, pushed by cylindrical push sleeve 10. The sealing of the front end portion of pipe 4 is not limited to this method, and any of the end face and the outer and inner surfaces of the front end portion of pipe 4 may be sealed.

In the embodiment shown in FIGS. 1 and 2, the end face of the front end portion of corrugated pipe 4 is sealed. Seal means 13 is formed of annular surface 14 situated behind small-diameter portion 3 on the inner peripheral surface of cylindrical body 1. The end face of the front end portion of advanced pipe 4 is pressed against seal means 13 or surface 14 to effect sealing.

In an embodiment shown in FIG. 3, the outer surface of the front end portion of corrugated pipe 4 is sealed. Seal means 13 is formed of taper surface 15 which, situated behind small-diameter portion 3 on the inner peripheral surface of cylindrical body 1, is gradually reduced in diameter toward the rear end. The front end portion of advanced pipe 4 is inserted into seal means 13 or taper surface 15 so that its outer surface is pressed against surface 15 to effect sealing.

In an embodiment shown in FIG. 4, the inner surface of the front end portion of corrugated pipe 4 is sealed. Seal means 13 is formed of cylindrical seal member 16 inserted in cylindrical body 1. Seal member 16, which is made of metal, is adapted to be fitted in inserted corrugated pipe 4. The outer peripheral surface of the fitting portion of member 16 is formed of taper surface 17 which is reduced in diameter toward the front end. Seal member 16 is fitted into advanced pipe 4 so that the inner surface of the front end portion of pipe 4 is pressed against gradually spreading taper surface 17 of member 16 to effect sealing.

As seen from FIG. 5, the fluid coupling is provided with fixing mechanism 18 for fixing sleeve 8 which is moved to the rear end side in order to connectedly fix and seal corrugated pipe 4. In this embodiment, mechanism 18 includes spiral guide groove 19 on the outer peripheral surface of cylindrical body 1, engaging pin 20 on sleeve 8 adapted to engage groove 19, axial portion 21 at the rear end of sleeve 8, and stopper 22 on body 1. Engaging pin 20 causes sleeve 8 to move in the axial direction while rotating on cylindrical body 1. Portion 21, which has an engaging surface on its leading side of rotation, rotates as sleeve 8 moves to the front end side. Stopper 22 is adapted to engage portion 21 when sleeve 8 is retreated to its full-back position, that is, when the connection or fixing and sealing of corrugated pipe 4 is finished. Before engaging axial portion 21, stopper 22, which is formed of a resilient material, runs on the rear edge portion of sleeve 8 moved to the rear end side by rotation. After the engagement, sleeve 8 is prevented from rotating to move to the front end side, and is securely fixed in position. In this embodiment, guide groove 19 and engaging pin 20 are formed on the outer peripheral surface of cylindrical body 1 and sleeve 8, respectively. Alternatively, however, a guide groove and an engaging pin may be provided on sleeve 8 and the outer peripheral surface of body 1, respectively. Numeral 23 designates a gasket formed of an elastic material such as rubber.

What is claimed is:

1. A fitting for a metallic flexible, corrugated pipe, comprising:

a tubular main body having first and second ends;

a pipe insertion section formed in said tubular main body at said first end, said pipe insertion section including a large-diameter portion, and a small-diameter portion continuous with the large-diameter portion and located further inside the large-diameter portion;

a ring-shaped engaging member movably held by the large-diameter portion and movable toward the small-diameter portion, said engaging member being expansible or compressible and engaging with a root portion of a cylindrical, outer peripheral surface of the flexible pipe inserted in to said tubular main body when said engaging member is compressed;

a sleeve fitted around an outer peripheral surface of said tubular main body and movable in an axial direction;

a tubular pressing member, provided in said sleeve, for enclosing the flexible pipe, said pressing member having an outer circumference engaged with said sleeve and being permitted to advance toward the small-diameter portion when said pressing member is located in said tubular main body; and an annular metallic seal means which is tightly pressed against one of a distal end face, an outer surface and an inner surface of said pipe, to thereby seal said pipe, when said pipe is moved into said main body while being engaged with said engaging member.

2. The fitting according to claim 1, wherein said large-diameter portion and said small-diameter portion are continuous with a transitive portion formed of a first taper surface converging toward said second end, said tubular pressing member having a first end portion provided with a second taper surface on the inner edge portion thereof, tapered oppositely to the taper surface of the transitive portion, and said ring-shaped engaging member is reducible in diameter by the first and second taper surfaces when the tubular pressing member is advanced toward the small diameter portion.

3. The fitting according to claim 2, wherein said outer peripheral surface of said tubular main body lies adjacent said first end, and further wherein said sleeve is slidable on said outer peripheral surface and includes an end wall with a center hole through which the corrugated pipe can be passed, said end wall being adapted to move the tubular pressing member toward the second end of the tubular main body when the sleeve is moved on the tubular main body toward the second end thereof, to thereby hold the flexible corrugated pipe in a predetermined axial position where an end portion of the corrugated flexible pipe is pressed against the seal means to be sealed thereby.

4. The fitting according to claim 3, wherein said tubular main body includes a spiral guide groove formed on the outer peripheral surface thereof, and a stopper for fixing the sleeve when the end portion of the corrugated pipe is sealed by the seal means; another end of said sleeve remote from said end wall includes a projection protruding radially inward and adapted to be guided by the groove, and an axial projection capable of engaging the stopper; and wherein said tubular pressing member includes a circumferential projection protruding radially outward from and outer peripheral surface thereof and adapted to engage the end wall of said sleeve.

5. The fitting according to claim 4, wherein said seal means includes an annular surface adapted to be pressed and sealed by at least one of an end face of the corrugated pipe and an end-face-side surface of the top portion thereof, between the small-diameter portion and the fluid passage.

6. The fitting according to claim 4, wherein said seal means includes a taper surface converging toward the fluid passage and adapted to be pressed and sealed by a top portion of the corrugated pipe, between the small-diameter portion and the fluid passage.

7. The fitting according to claim 4, and further comprising a cylindrical seal member disposed inside the tubular main body and having one end capable of being inserted into the corrugated pipe inserted in the tubular main body, said seal member including a tapered seal surface on the outer periphery thereof, converging toward said one end.

8. The fitting according to claim 4, wherein said stopper is formed of a resilient sheet body.

9. The fitting according to claim 8, wherein said tubular main body, sleeve, ring-shaped engaging member, and tubular pressing member are made of metal.

10. The fitting according to claim 5, wherein said end wall and said axial projection are formed integral with each other.

* * * * *